US010697313B2

(12) United States Patent
Correia (10) Patent No.: US 10,697,313 B2
(45) Date of Patent: Jun. 30, 2020

(54) TURBINE ENGINE COMPONENT WITH AN INSERT (71) Applicant: General Electric Company, Schenectady, NY (US)

(72) Inventor: Victor Hugo Silva Correia, Milton Mills, NH (US)

(73) Assignee: General Electric Company, Schenectady, NY (US)

( * ) Notice: Subject to any disclaimer, the term of this patent is extended or adjusted under 35 U.S.C. 154(b) by 459 days.

(21) Appl. No.: 15/421,531

(22) Filed: Feb. 1, 2017

(65) Prior Publication Data

US 2019/0003324 A1    Jan. 3, 2019

(51) Int. Cl.
| *F01D 9/04* | (2006.01) |
| *F01D 25/12* | (2006.01) |
| *F01D 9/06* | (2006.01) |
| *F01D 5/28* | (2006.01) |

(52) U.S. Cl.
CPC ............ *F01D 9/042* (2013.01); *F01D 9/065* (2013.01); *F01D 25/12* (2013.01); *F01D 5/282* (2013.01); *F01D 5/284* (2013.01); *F05D 2230/64* (2013.01); *F05D 2240/122* (2013.01); *F05D 2240/125* (2013.01); *F05D 2240/128* (2013.01); *F05D 2240/81* (2013.01); *F05D 2260/202* (2013.01); *F05D 2260/204* (2013.01); *F05D 2260/36* (2013.01); *F05D 2300/6033* (2013.01)

(58) Field of Classification Search
CPC .......... F01D 9/042; F01D 9/065; F01D 25/12; F01D 5/284; F05D 2230/64; F05D 2240/122; F05D 2240/125; F05D 2240/128; F05D 2240/81; F05D 2260/202; F05D 2260/204; F05D 2260/36; F05D 2300/6033
See application file for complete search history.

(56) References Cited

U.S. PATENT DOCUMENTS

| 4,222,706 | A | * | 9/1980 | Ayache | ................... | F01D 11/08 |
| | | | | | | 415/116 |
| 4,353,679 | A | * | 10/1982 | Hauser | ................... | F01D 5/189 |
| | | | | | | 415/115 |
| 4,384,607 | A | | 5/1983 | Wood et al. | | |
| 5,358,379 | A | * | 10/1994 | Pepperman | ............. | F01D 5/147 |
| | | | | | | 415/191 |
| 6,227,798 | B1 | | 5/2001 | Demers et al. | | |
| 6,830,427 | B2 | * | 12/2004 | Lafarge | ................... | F01D 5/288 |
| | | | | | | 415/115 |
| 7,488,157 | B2 | * | 2/2009 | Marini | .................... | F01D 5/147 |
| | | | | | | 416/193 A |
| 7,648,341 | B2 | * | 1/2010 | Lau | ....................... | F04D 29/324 |
| | | | | | | 29/402.08 |
| 7,857,580 | B1 | | 12/2010 | Liang | | |

(Continued)

OTHER PUBLICATIONS

International Search Report and Written Opinion issued in connection with corresponding PCT Application No. PCT/US2018/013754 dated Nov. 7, 2018.

*Primary Examiner* — Richard A Edgar
(74) *Attorney, Agent, or Firm* — McGarry Bair PC (57) ABSTRACT

A component for a turbine engine comprises a wall with a surface along which a hot airflow passes, a second surface along which a cooling airflow passes, and an insert mounted to the wall wherein the material used for the insert can have a higher temperature capability than that of the wall.

32 Claims, 5 Drawing Sheets

(56) References Cited

U.S. PATENT DOCUMENTS

| | | | |
|---|---|---|---|
| 7,976,281 B2* | 7/2011 | Keith | F01D 5/147 |
| | | | 416/193 A |
| 8,206,096 B2 | 6/2012 | Prentice et al. | |
| 8,235,652 B2 | 8/2012 | Broomer et al. | |
| 8,296,945 B2 | 10/2012 | Broomer et al. | |
| 8,851,845 B2* | 10/2014 | Brittingham | F01D 5/186 |
| | | | 416/193 A |
| 8,943,835 B2 | 2/2015 | Corsmeier et al. | |
| 8,979,489 B2 | 3/2015 | Taillant et al. | |
| 2007/0122266 A1 | 5/2007 | Cairo et al. | |
| 2008/0025842 A1 | 1/2008 | Marini et al. | |
| 2010/0028131 A1 | 2/2010 | Arrell et al. | |
| 2014/0023483 A1 | 1/2014 | Wiebe et al. | |
| 2015/0064020 A1 | 3/2015 | Beeck | |
| 2016/0177761 A1 | 6/2016 | Huizenga et al. | |
| 2016/0290147 A1 | 10/2016 | Weaver | |

* cited by examiner

TURBINE ENGINE COMPONENT WITH AN INSERT

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components such as the compressor, high pressure turbine, or low pressure turbine, as well as applying additional thermal protection for these components, can be beneficial.

BRIEF DESCRIPTION OF THE INVENTION

In one aspect, a component for a turbine engine comprises a wall having a first surface along which a hot airflow passes, a second surface, spaced from the first surface, and along which a cooling airflow passes, and an insert mounted to the wall where the insert has a higher temperature capability than the wall.

In another aspect, a vane assembly for a turbine engine comprises radially spaced inner and outer bands having axially spaced fore and aft edges, a plurality of vanes extending between the inner and outer bands, and an insert mounted to at least one of the inner or outer bands where the insert has a temperature capability greater than the at least one of the inner or outer bands to which the insert is mounted.

In yet another aspect, a method of making a vane assembly for a turbine engine comprises forming a notch in a band of the vane assembly and mounting an insert within the notch, with the insert having a higher temperature capability than the band.

DESCRIPTION OF EMBODIMENTS OF THE INVENTION

The described embodiments of the present disclosure are directed to an insert for a component in the turbine section of an aircraft turbine engine. It will be understood, however, that the disclosure is not so limited and may have general applicability within an engine, including the compressor section, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
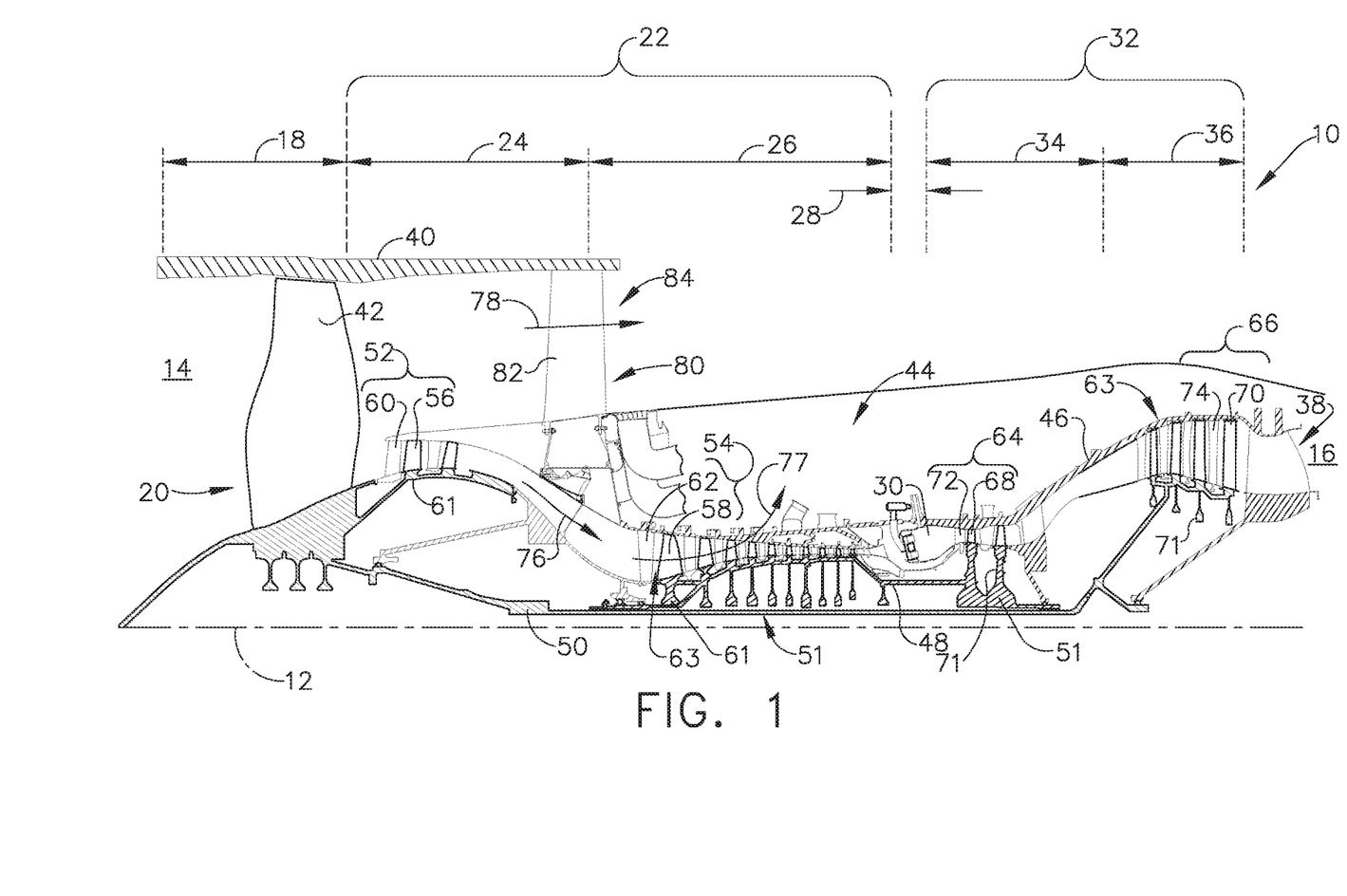
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the turbine can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
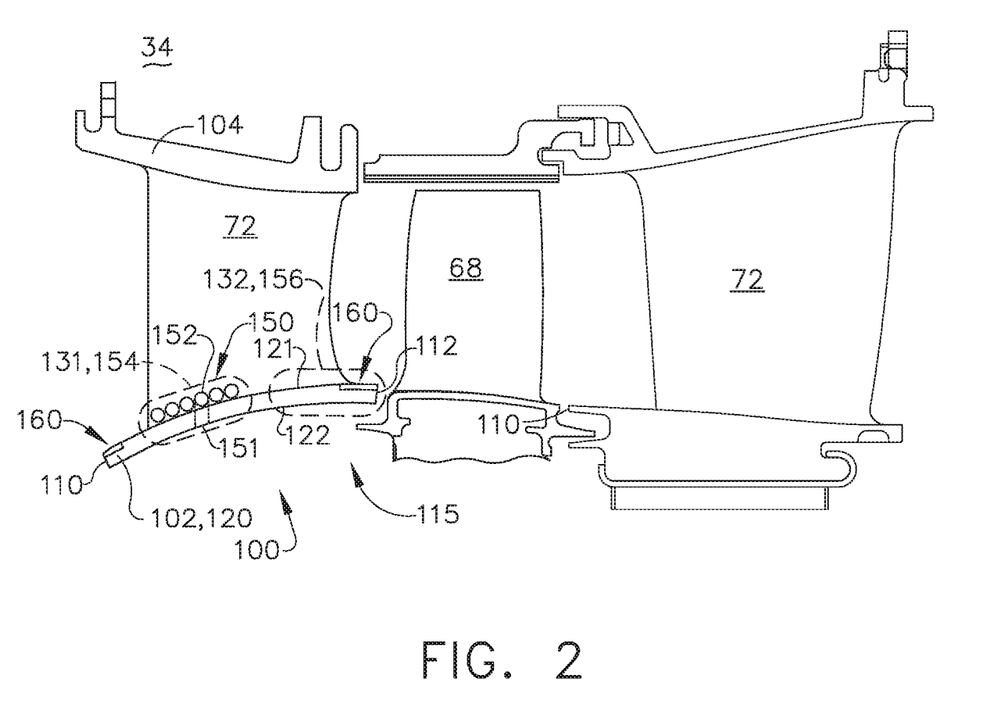
FIG. 2 is a circumferential view of a portion of a high pressure turbine of the turbine engine of FIG. 1.

FIG. 2 illustrates a circumferential view of a portion of a turbine, such as the HP turbine 34, in the turbine engine of FIG. 1 according to a first embodiment of the disclosure. The HP turbine 34 includes the HP turbine stage 64 having a component 115 such as a stationary vane assembly 100, and it should be understood that the component 115 may also comprise at least one of a nozzle, vane segment, shroud segment, blade segment, inner band segment, or outer band segment in the compressor section 22 or the turbine section 32 in the turbine engine 10. The vane assembly 100 can comprise an inner band 102 having a fore edge 110 and aft edge 112, an outer band 104 radially spaced from the inner band 102, and the vane 72 which extends between the inner and outer bands 102, 104; it should be understood that the vane 72 can comprise a plurality of vanes 72 arranged circumferentially between the bands 102, 104. The component 115 comprises a wall 120 having a first surface 121 and a second surface 122 spaced from the first surface 121. The wall 120 may further comprise a first portion 131 that includes at least one film hole 150 extending through the wall 120, where the film hole 150 can have an inlet 151 on the second surface 122 and an outlet 152 on the first surface 121, as well as a second portion 132 that does not include a film hole. In this way a film-cooling area 154 may be defined by the first portion 131, and a non-film-cooling area 156 may be defined by the second portion 132, wherein the film-cooling area 154 can be positioned near the fore edge 110 and the non-film-cooling area 156 can be positioned near the aft edge 112 as shown. An insert 160 may be mounted to the component 115, and it is contemplated that the insert 160 can be mounted to the fore edge 110 or aft edge 112 of the component 115 as shown. In addition, while the component 115 is illustrated herein as including the film-cooling area 154 and non-film-cooling area 156, the disclosure is not so limited and it should be understood that the insert 160 may also be mounted to a component that does not include film hole cooling.

Figure 3:
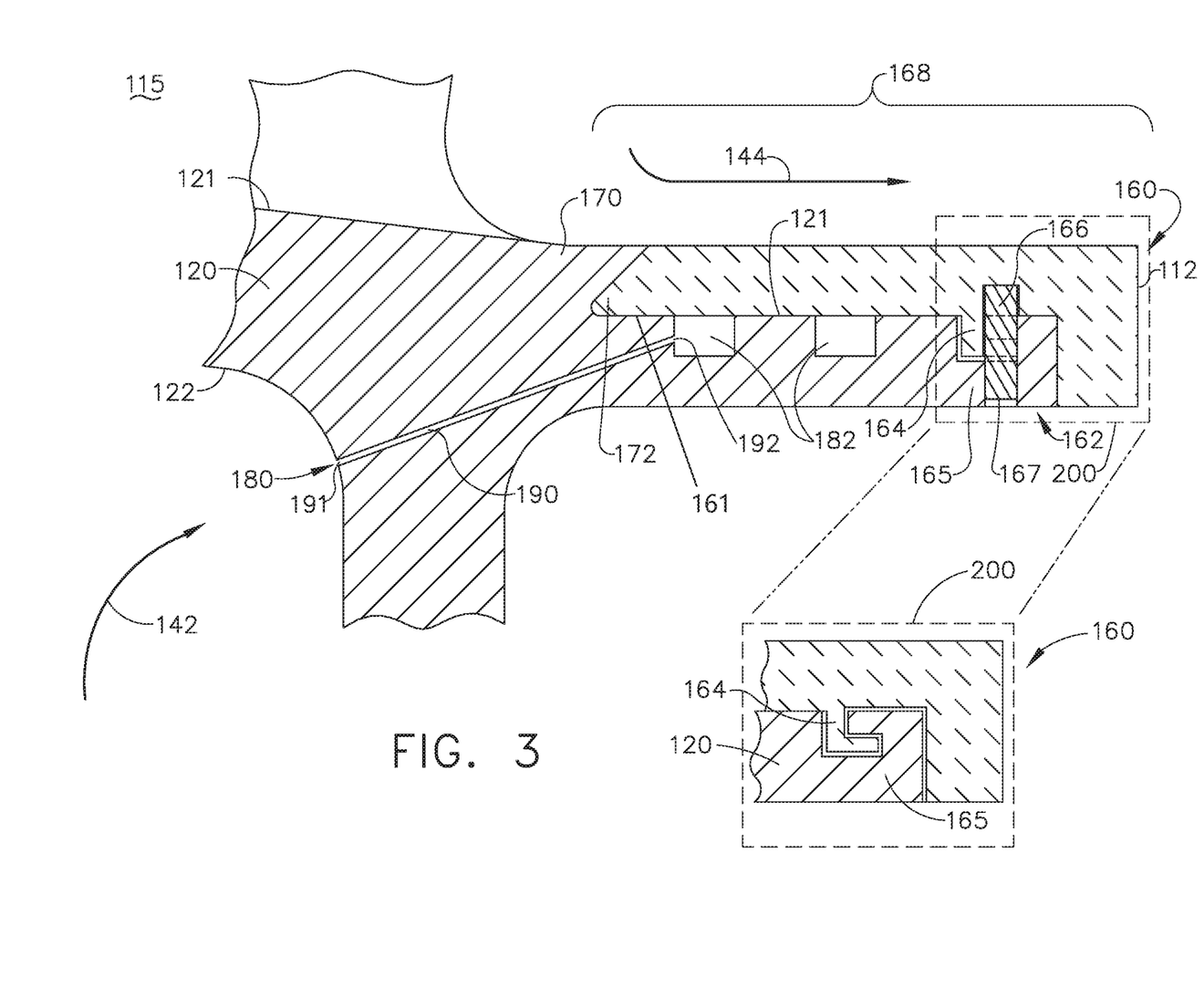
FIG. 3 is a circumferential cross-sectional diagram of a portion of a component including an insert in the high pressure turbine of FIG. 2.

FIG. 3 is a circumferential cross-sectional diagram of a portion of the component 115 in the turbine of FIG. 2. The insert 160 can be mounted to the wall 120 and include a first surface 161 which can be planar with the first surface 121 of the wall 120. A mechanical coupling may be used to connect the insert 160 to the wall 120; in one non-limiting example the coupling may comprise a dove tail 162 wherein the wall can define a notch 168 with an overhang 170 while the insert 160 can include a nose 172, and a projection 164 on the insert 160 can join with a recess 165 provided in the wall 120 in a hook type arrangement (the expanded view 200 illustrates the hook arrangement in closer detail). It should be understood the projection 164 may also be provided on the wall 120 and the recess 165 may be provided on the insert 160 in an alternative hook arrangement. In addition, another mechanical coupling can include a cavity 167 which may be provided in the wall 120 for the slidable receipt of a pin 166 as an auxiliary mechanical coupling of the insert 160 to the wall 120. The insert 160 may slide along the first surface 161 in the circumferential direction to join with the component 115; while mounting, the nose 172 can be received under the overhang 170 and the projection 164 can be received by the recess 165. Once mounted, the pin 166 can be inserted into the cavity 167 to retain relative circumferential movement between the insert 160 and the component 115. In this arrangement the insert 160 can define the trailing (aft) edge 112 of the component 115 with the top of the insert 160 coplanar with the first surface 121 as shown.

Figure 6:
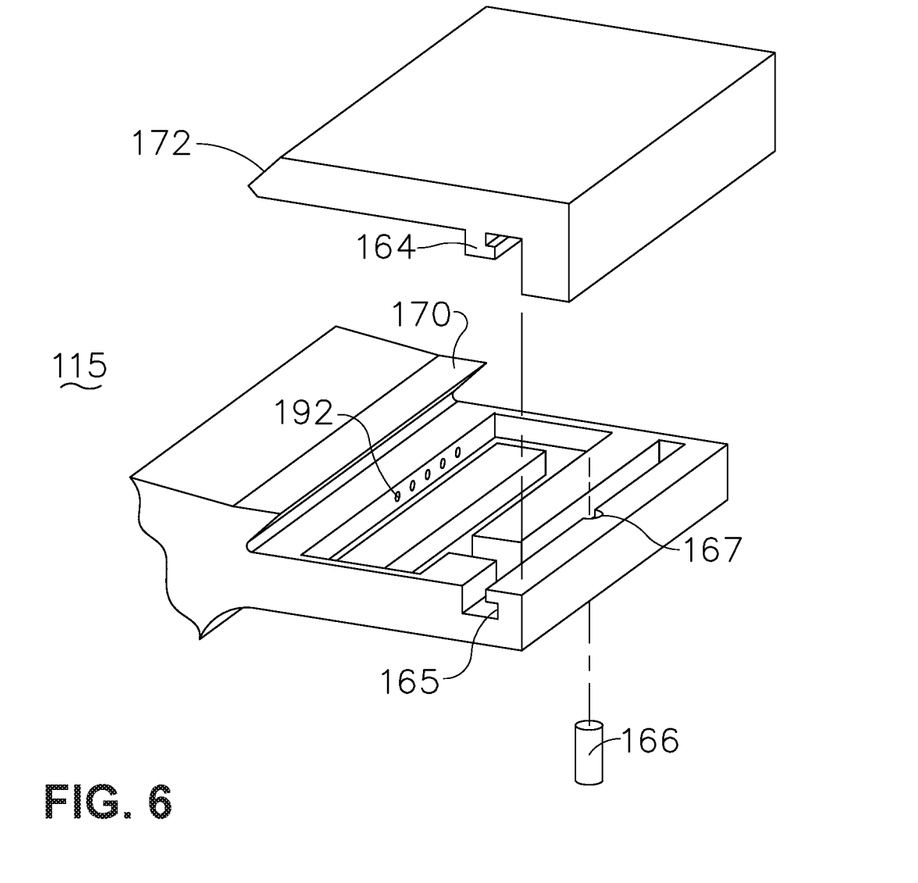
FIG. 6 is a partially exploded view of the component of FIG. 3 according to a second embodiment.

The notch 168 can further comprise at least one air flow channel 182 that confronts the insert 160 when mounted; while only a portion of the component 115 is illustrated, it should be understood that the air flow channels 182 can be annular around the core 44 of the turbine engine 10, and it is contemplated that the air flow channels 182 may form at least a partial spiral arrangement around the core 44. A cooling passage 180 including a cooling air hole 190 may be provided through the wall 120, wherein the cooling air hole 190 can have an inlet 191 on the second surface 122 and an outlet 192 in fluid connection with at least one air flow channel 182, such that the cooling passage 180 can extend from the second surface 122 to the air flow channel 182 as shown. Other arrangements in the spirit of the present disclosure are contemplated for the air flow channel 182 such as a serpentine arrangement (illustrated in FIG. 6), or that an air flow channel 182 may comprise multiple air flow channels 182 having varying width or depth.

In operation, a hot airflow 144 can pass along the first surface 121 while a cooling airflow 142 can pass along the second surface 122 of the wall 120. The cooling airflow 142 can also pass through film holes 150 and provide thermal cooling to the surface 121 in the film-cooling area 154, and this cooling air film may dissolve or become less effective in the non-film-cooling area 156 at which point there may be a high amount of convective heat in this region of the component 115. A portion of the cooling airflow 142 near the second surface 122 can also pass through the cooling passage 180 into the air flow channel 182. It can therefore be appreciated that the insert 160 can provide a thermal barrier along the first surface 121 while also trapping cooling air in the air flow channels 182 which can reduce the amount of heat near the aft edge 112 of the component 115, where the area that is not cooled by film can be protected by the insert 160 which can withstand higher temperatures than the material of 120.

It is contemplated that the material used for the insert 160 can have a higher temperature capability than the material used for the wall 120, wherein the temperature capability can be defined as the highest operating temperature contemplated for use for a given material in the turbine engine environment, and subjecting the material to temperatures higher than its temperature capability can cause effects such as oxidation, fatigue, or melting of the material. For example, the insert 160 may be made of ceramic matrix composite (CMC) or monolithic ceramic while the wall 120 may be made of metal having a lower temperature capability than the insert material. However, such examples are not meant to be limiting and any material suitable for the turbine engine environment is contemplated for use in this disclosure.

Figure 4:
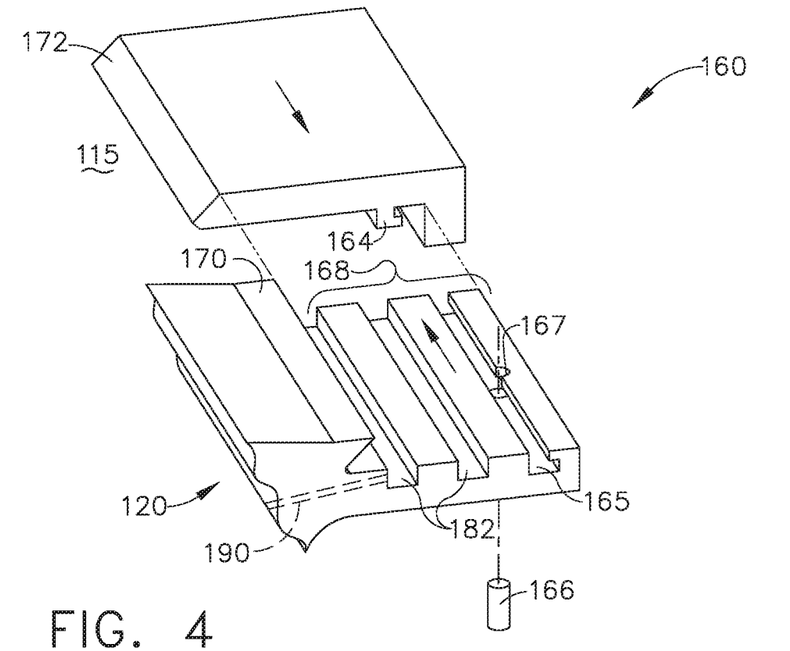
FIG. 4 is a partially exploded view of the component of FIG. 3 looking toward the aft direction according to a first embodiment.

FIG. 4 illustrates a partially exploded view of the component 115 looking toward the aft direction. The projection 164 and recess 165 are illustrated with a substantially hook type profile; however, any other geometry having a complementary profile is contemplated for use in the projection 164 and recess 165 of the dove tail 162. In addition, the cavity 167 is shown through multiple points within the recess 165, and it is therefore contemplated in a non-limiting example that the pin 166 may have a diameter that is larger than a width of the recess 165.

Figure 5:
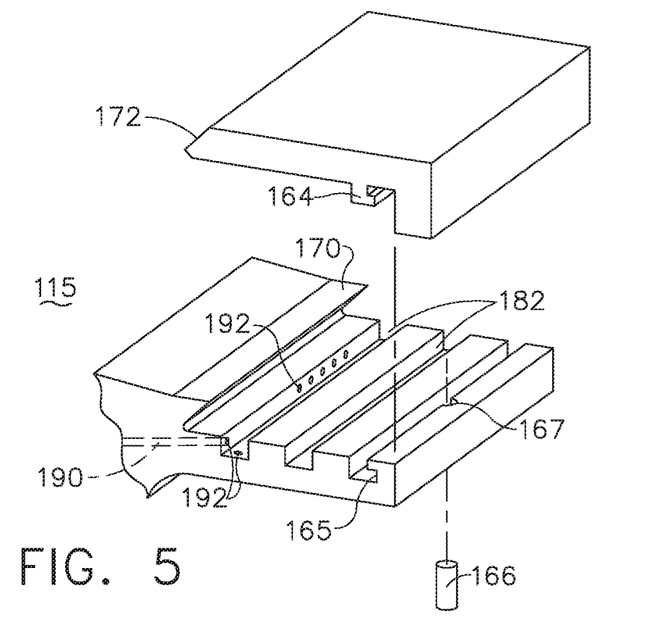
FIG. 5 is a partially exploded view of the component of FIG. 3 looking toward the fore direction.

FIG. 5 illustrates the component 115 looking toward the fore direction with parallel air flow channels 182. The outlet 192 of the cooling air hole 190 can be positioned on any portion of the air flow channel 182, such as on a side wall or lower surface. In addition, there may be multiple cooling air holes 190 supplying cooling air to the air flow channel 182 as shown.

A method of making the vane assembly 100 can comprise forming the notch 168 in the inner band 102 or outer band 104 downstream of the film-cooling area 154 (FIG. 3), mounting the insert 160 within the notch 168 by positioning the nose 172 under a ledge such as the overhang 170 and coupling the insert 160 to the notch 168 with the dove tail 162, projection 164, and recess 165 (FIGS. 4, 5), and providing the cooling airflow 142 below the insert 160 (FIG. 3).

It can be appreciated that the insert 160 can provide a thermal protective barrier when mounted to an engine component in fluid connection with high-temperature airflows, preventing material distress such as oxidation and fatigue of the engine component. In addition, the provision of cooling air beneath the insert 160 can further prevent material distress and also provide extra insulation for the engine component against high temperatures in its environment. As a result, it is possible to increase the durability of the engine component to which the insert 160 is mounted. In addition, the insert 160 may also be used during repair of an engine component where a damaged portion of the component 115 is removed before mounting the insert 160.

It should be understood that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine comprising:
   a wall defining a notch and having a first surface along which a hot airflow passes, and a second surface, spaced from the first surface, along which a cooling airflow passes;
   an insert mounted to the wall within the notch and defining a leading edge or a trailing edge of the component, where the insert has a higher temperature capability than the wall;
   at least one air flow channel formed as a recess within the notch and confronting the insert; and
   a cooling passage defined through the wall having an inlet on the second surface and an outlet in fluid communication with the at least one air flow channel.

2. The component of claim 1 further comprising:
   at least one first portion of the wall having at least one film hole extending between the second and first surfaces to define a film cooling area on the first surface, wherein the cooling airflow flows through the at least one film hole to the first surface; and at least one second portion of the wall, downstream of the at least one first portion, without at least one film hole between the second and first surfaces to define a non-film cooling area.

3. The component of claim 2 where the insert is mounted in the non-film cooling area.

4. The component of claim 1 wherein the insert is made of ceramic matrix composite (CMC) or monolithic ceramic.

5. The component of claim 4 wherein the wall is made of metal.

6. The component of claim 1 further comprising a mechanical coupling connecting the insert to the wall.

7. The component of claim 6 wherein the mechanical coupling comprises a dovetail and hook arrangement with a tangential pin lock.

8. The component of claim 1 wherein the insert has a first surface that is planar with the first surface of the wall when the insert is mounted to the wall.

9. The component of claim 1 wherein the at least one air flow channel is fluidly coupled to the cooling airflow.

10. The component of claim 1 wherein the at least one air flow channel has a serpentine arrangement.

11. The component of claim 1 wherein the wall has an overhang at the notch and the insert has a nose received under the overhang when the insert is mounted to the wall.

12. The component of claim 11 wherein the insert has a first surface that is planar with the first surface of the wall when the insert is mounted to the wall.

13. The component of claim 1 wherein the component comprises one of: a vane segment, shroud segment, blade segment, inner band segment, and outer band segment.

14. A vane assembly for a turbine engine comprising:
radially spaced inner and outer bands having axially spaced fore and aft edges, with at least one of the inner or outer bands defining a notch;
a plurality of vanes extending between the inner and outer bands;
an insert mounted to the at least one of the inner or outer bands within the notch, wherein the insert has a temperature capability greater than the at least one of the inner or outer bands to which the insert is mounted; and
at least one air flow channel formed as a recess within the notch and confronting the insert; and
a cooling passage defined through the at least one of the inner and outer bands, having an inlet on a surface along which a cooling airflow passes and an outlet in fluid communication with the at least one air flow channel.

15. The vane assembly of claim 14 further comprising a plurality of film holes in at least one of the vanes, inner band, or outer band defining a film cooling area.

16. The vane assembly of claim 15 wherein the film cooling area is near the fore edge and the insert is near the aft edge.

17. The vane assembly of claim 16 wherein the film cooling area forms the fore edge.

18. The vane assembly of claim 16 wherein the insert defines an upper surface, which is coplanar with an upper surface of the at least one of the inner or outer bands.

19. The vane assembly of claim 17 wherein the insert is on the inner band.

20. The vane assembly of claim 14 wherein the at least one air flow channel is fluidly coupled to a cooling airflow.

21. The vane assembly of claim 20 wherein the at least one air flow channel has a serpentine arrangement.

22. The vane assembly of claim 21 wherein the at least one of the inner and outer bands has an overhang at the notch and the insert has a nose received under the overhang.

23. A method of making a vane assembly for a turbine engine, the method comprising:
forming a notch in a band of the vane assembly;
forming a recess within the notch to define an air flow channel;
mounting an insert within the notch, with the insert having a higher temperature capability than the band; and with the air flow channel confronting the insert; and
defining a cooling passage through the band having an inlet on a surface along which a cooling airflow passes and an outlet in fluid communication with the at least one air flow channel.

24. The method of claim 23 wherein the notch is formed downstream of a film cooled area of the band.

25. The method of claim 23 wherein mounting the insert within the notch comprises coupling the insert to the notch with a dove tail.

26. The method of claim 25 wherein mounting the insert within the notch comprising positioning a nose of the insert under a ledge in the band.

27. The method of claim 23 further comprising providing a cooling airflow within the air flow channel.

28. The method of claim 23 further comprising removing a damaged portion of the band.

29. The component of claim 1 wherein the at least one air flow channel comprises multiple air flow channels within the notch.

30. The component of claim 29 wherein the multiple air flow channels form a parallel arrangement within the notch.

31. The vane assembly of claim 14 wherein the at least one air flow channel comprises multiple air flow channels within the notch.

32. The vane assembly of claim 31 wherein the multiple air flow channels form a parallel arrangement within the notch.

* * * * *